United States Patent [19]

Nolan et al.

[11] Patent Number: 4,964,328
[45] Date of Patent: Oct. 23, 1990

[54] NOTCHING BLADE ASSEMBLY

[75] Inventors: John H. Nolan, Mt. Clemens; Dennis Skvarce, Wixom, both of Mich.

[73] Assignee: Alpha Industries, Inc., Novi, Mich.

[21] Appl. No.: 249,362

[22] Filed: Sep. 23, 1988

[51] Int. Cl.$^5$ .............................................. B26D 1/60
[52] U.S. Cl. ...................................... 83/698; 83/700; 83/319; 83/949
[58] Field of Search ................... 83/54, 300, 319, 320, 83/698, 699, 700, 916, 917, 926 G, 862; 269/71, 235

[56] References Cited

U.S. PATENT DOCUMENTS

| | | | |
|---|---|---|---|
| 2,304,771 | 12/1942 | Davis | 83/700 |
| 3,129,624 | 4/1964 | Auer | 83/300 |
| 3,273,433 | 9/1966 | Borzym | 83/54 |
| 3,905,264 | 9/1975 | Eddy | 83/699 |
| 4,108,029 | 8/1978 | Borzym | 83/300 |
| 4,109,555 | 8/1978 | Borzym | 83/319 |
| 4,694,718 | 9/1987 | Kinsley | 83/319 |
| 4,766,792 | 8/1988 | Borzym et al. | |
| 4,872,384 | 10/1989 | Borzym | 83/454 |

Primary Examiner—Frank T. Yost
Assistant Examiner—Scott A. Smith
Attorney, Agent, or Firm—Krass & Young

[57] ABSTRACT

A notching blade assembly specifically for use in a double-cut die set of the type used to cut tubing continuously emanating from the tube mill. The present invention is directed toward the notching blade assembly used in conjunction with the vertical guillotine blade of the cut-off die set to notch the upper surface of the tubing prior to the shearing cut.

The subject device includes a guide member mounted to a cross slide assembly affixed to a double cut die set, having a notching blade holder displaceably mounted to the guide member allowing the holder to be positioned at any point along the guide member. The invention further includes an adjustment screw mounted in a base and threadedly; coupled to the notching blade holder, whereby rotation of the adjustment screw can be used to vary the position of the notching blade holder on said guideway. The subject device further includes a notching blade mounted in a notching blade cartridge, when the cartridge is retained in a chamber on the notching blade holder said chamber having slots cut rearwardly of the body of the chamber allowing the notching blade and notching blade cartridge to be forced back into the holder assembly thus avoiding a failure should the vertical or guillotine blade be broken and left in the die set.

30 Claims, 6 Drawing Sheets

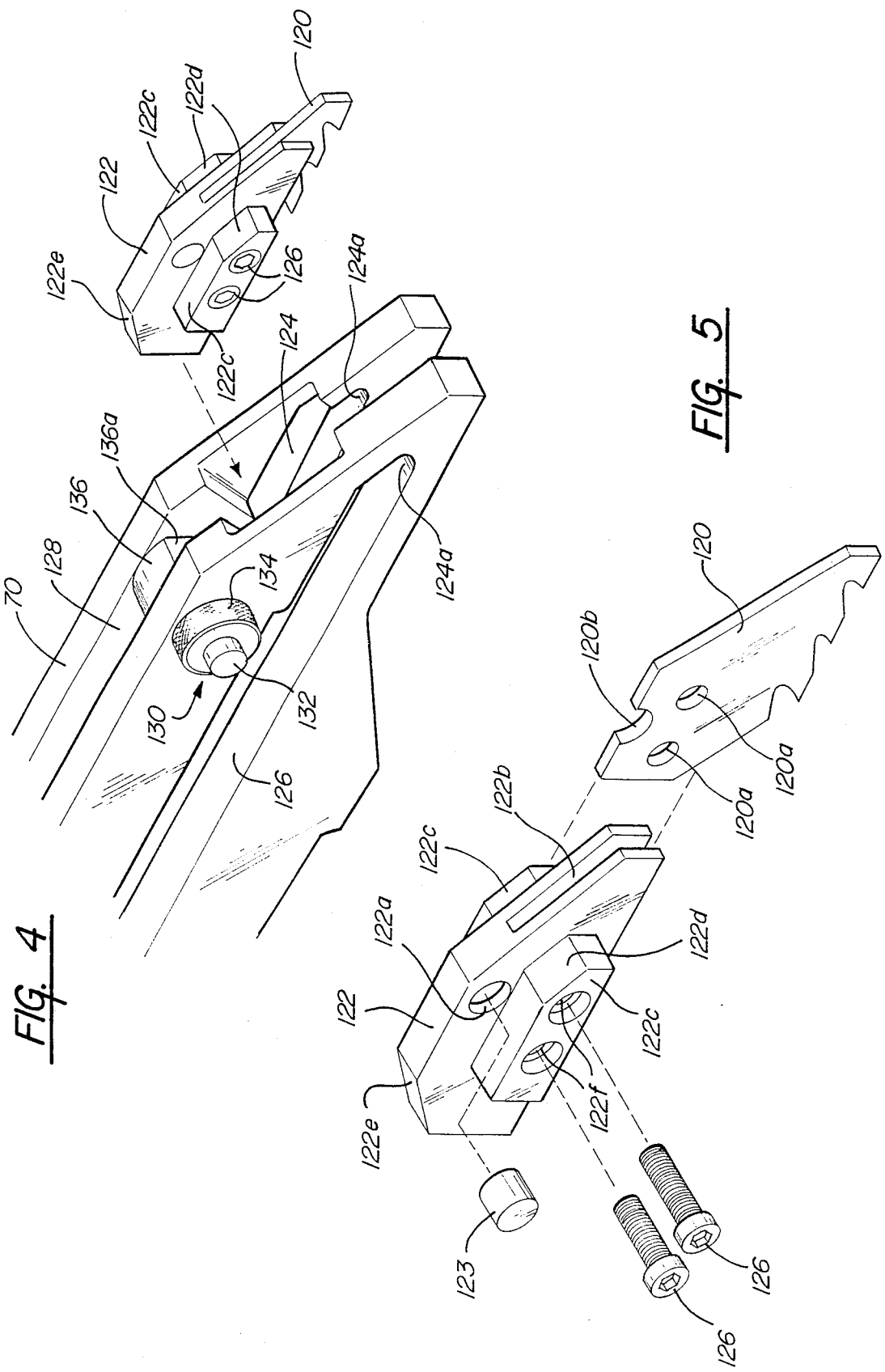

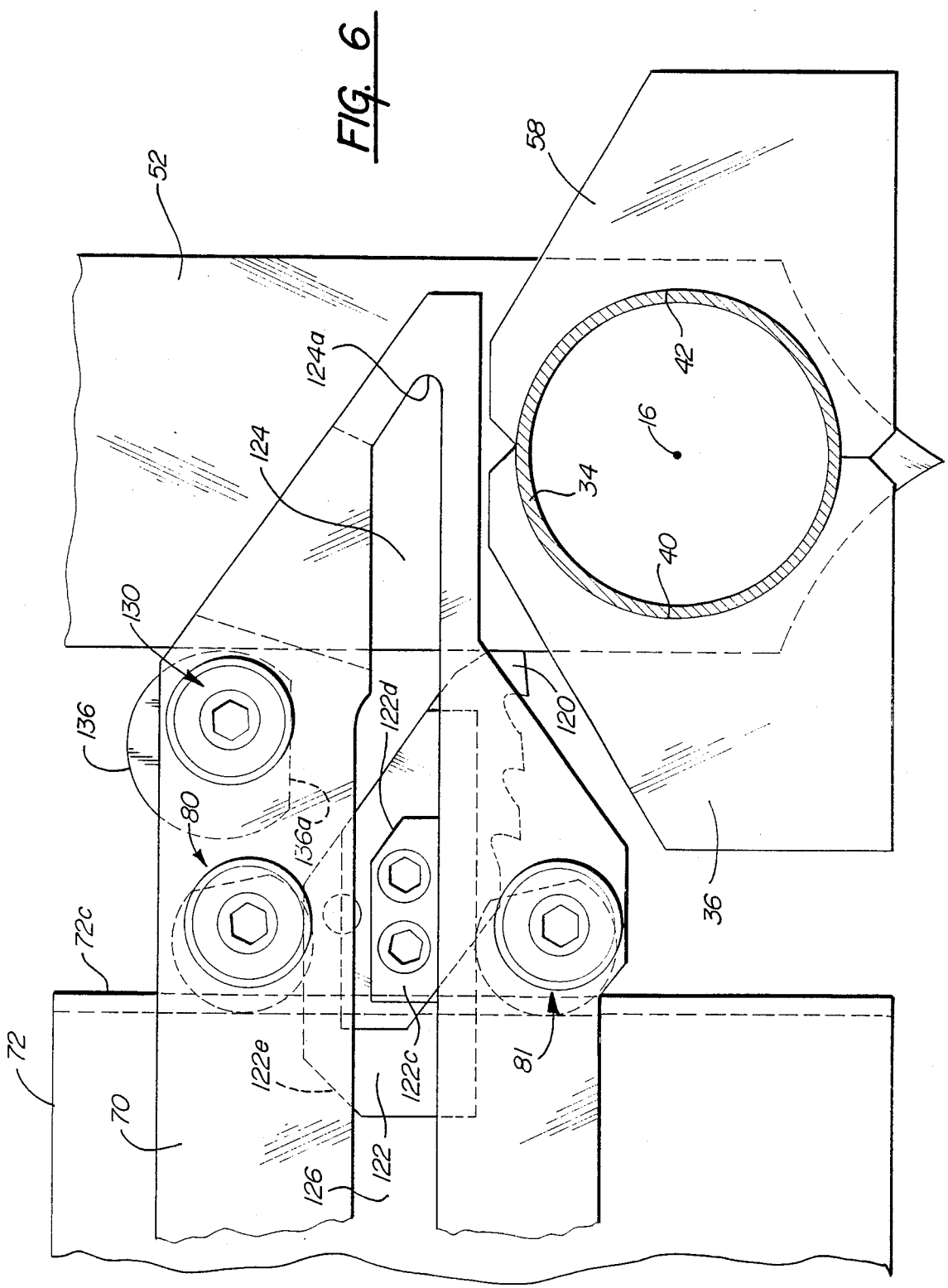

NOTCHING BLADE ASSEMBLY

INTRODUCTION

This invention relates to a double cut die set of the type often used in combination with a press to cut tubing as it is fabricated. More specifically, the present invention is directed toward improvements in the notching blade assembly of a double-cut die set which facilitate the installation, replacement and positioning of the notching blade.

BACKGROUND OF THE INVENTION

In a cut-off die set of the double cut type, a notching blade is caused to move across and notch the upper surface of the tubing prior to entry of the shearing blade into the upper tube wall. This prenotching eliminates dimpling or collapsing of the tube wall by the shearing blade, thus eliminating the need for reshaping the ends of the tubing after the cutting operation.

The notching apparatus typically comprises a notching blade fixed or mounted to a notching blade holder which is mounted to a cross slide assembly. Cross-slide assemblies are known, see U.S. Pat. No. 4,766,792. The cross slide assembly is operated by the upper platen of the die set by way of a mechanical cam and cam follower. The association is such that vertical travel of the upper platen of the die set causes the notching blade to travel through a transverse path perpendicular to the axial path of the tube. Both thrust and "pull across" motions are known. See for example U.S. Pat. Nos. 4,109,555 and 4,294,147.

Presently, the notching blade holder is mounted to a guideway fixed to the cross-slide assembly, wherein the guideway is adapted to receive and retain a slide member. The slide member is attached to the notching blade holder by screws so that the blade holder can be adjusted for different notching depths and for different tubing diameters. When rotated, the screws urge the slide member into contact with the guideway the result being to clamp the notching blade holder to a fixed position in the guideway. Varying the height of the notching blade relative to the tube path requires the operator to loosen the slide member clamping screws in order to release the slide member and enable repositioning of the holder. Once repositioned, the operator must retighten the slide member screws. This method of adjustment can result in inaccurate adjustments and is time consuming as the space limitations in the die set act to prohibit easy access to the adjusting screws.

Normally in the standard "pull across" die set when the die is in the open position allowing the tube to pass through the clamping jaws the notching blade is positioned across and over the upper surface of the clamping jaws making removal of the clamping jaws difficult. To change the clamping jaws, the operator must remove the notching blade holder to gain the access needed to change the clamping jaws. The additional requirement of removing the notching blade holder makes changing the clamping jaws a time consuming procedure.

At times the vertical cut or guillotine blade is broken during the cutting operation and remains lodged in the clamping jaws. When the die operates in the reverse manner and attempts to return the notching blade to the pre-cut position, the notching blade is prevented from returning by the broken guillotine blade lodged in the clamping jaws, thus resulting in a catastrophic failure of the die set. This failure requires shutting down the mill to replace at least portions of the die set assembly.

The notching blade which performs the cutting operation eventually succumbs to wear and must be replaced. To replace the notching blade, the notching blade must be unbolted from the notching blade holder and a new blade rebolted to the holder. Again a time consuming process.

As indicated, time is of the essence in the tube cutting industry, tubing continuously emanates from a tube mill at a high rate of speed. Thus, any problems, delays or shut downs due to repair or replacement of the cutting equipment results in lost production and revenue to the tube maker. Therefore, any time savings that result from ease in maintenance and/or replacement of parts increases the period the mill can be operational, thus increasing production.

SUMMARY OF THE INVENTION

The present invention is directed to the provision of an improved mounting and adjusting means for the notching blade of a cut-off die set of the double cut tube cut-off type. According to the invention, a guideway is mounted to the cross slide assembly of the double cut die set; a carriage having a means for selectively engaging the carriage in any position along the guideway is positioned in the guideway. Independent of the means for selectively engaging the carriage to the guideway is a separate means for adjusting the position of the carriage along the guideway. The subject device further including a means for coupling the carriage to the adjustment means. Finally, a notching blade is included having a means for securing or mounting the notching blade to the carriage.

In the preferred form this arrangement allows the carriage to be removed from the cross slide assembly thus allowing access to the die set. The invention also allows a coarse and fine adjustment to be made in the cutting depth of the notching blade relative to the tube surface. The subject device allows the notching blade to be removed and replaced in a quick and efficient manner. Further aspects allow the notching blade to be released from the retaining means should the notching blade encounter an immovable obstacle during the return stroke.

Another aspect of the invention includes a guide member at right angles to the direction of the cross slide movement. The guide member has opposite and parallel side surfaces extending perpendicular to the direction of cross slide movement. Guide notches extending the length of the sides establish the guideway for the carriage.

Other aspects of the invention include, first and second gibs mounted to the carriage providing an engaging mechanism for coupling the carriage to the guideway According to another aspect of the invention, a first gib is a load bearing member having a bearing surface complementary to a guide notch located on the guide member. The subject device further includes a second gib comprising a cam lock assembly mounted to the carriage. In the preferred form a guide member having guide notches is bolted to the cross slide assembly to establish a guideway existing at right angles to the motion of the cross slide. The carriage is placed on the guide member and is retained in position on the guide member by gibs mounted to the carriage and engaging the notches located on the guide member. The fixed gib has a side having a complementary cross section to that of the guide notch thus creating a load bearing surface. The second gib is a cam lock assembly. The eccentric of the cam lock assembly has a complementary cross section to the parallel and opposite guide notch located on the guide member. When the cam lock assembly is rotated both gibs are brought to bear on the guide member fixing the carriage in the selected position.

Another aspect of the invention includes an adjustment screw parallel to the guideway, threadably engaged to the carriage at one end and having a means fixing the other end so as to allow rotational movement only.

According to a further feature, a base is mounted to the cross slide assembly having an adjustment dial located between upper and lower flanges of the base The adjustment dial is fixedly attached to the adjustment screw and is the means for rotating the adjustment screw. In the preferred form, the carriage is released from the guideway by releasing the cam locks, the now released carriage is free to move along the guideway by rotating the adjustment dial which rotates the adjustment screw allowing movement of the carriage along the path of the guideway.

Another aspect of the invention includes a means for selectively coupling the carriage to the adjustment means. When the adjustment means comprises an adjustment screw the subject device further includes, a carriage having a half bore equal to the outer diameter of the adjustment screw and a half nut mounted to a pivot pin retained in the carriage for threadably engaging and retaining the adjustment screw to the carriage. A spring loaded detent pin is also used as a means to secure the half nut to the carriage. A handle is further included on the half nut enabling the operator to open and close the half nut as required. In the preferred form the half nut assembly allows the operator to selectively couple and uncouple the carriage to the adjustment screw. When making large adjustments the operator uncouples the half nut from the adjustment screw threads. Once uncoupled the operator releases the cam locks enabling the carriage to be moved along the guideway quickly, without having to turn the adjustment screw. After the rough adjustment is made, the operator then closes the half nut thereby recoupling the adjustment screw to the carriage. Fine adjustments may then be made using the adjustment screw by way of the calibrated adjustment dial fixed to the base of the adjustment screw.

Another aspect of the invention includes a means for securing the notching blade to the carriage including, a notching blade, a notching blade cartridge, a means for mounting the notching blade in the notching blade cartridge, and a means for retaining the notching blade cartridge in a fixed position within the carriage.

According to a further feature the notching blade has a half bore located in the upper surface of the blade for engaging a pin extending through the blade cartridge. A plurality of fasteners are used to retain the notching blade to the blade cartridge. The invention further includes a cartridge chamber located within the carriage for retaining the notching blade cartridge. The cartridge chamber has transverse and longitudinal slots extending outward from the chamber along the carriage opposite the tube path. The blade cartridge has transverse projections for retaining the cartridge in the slots. The cartridge chamber has a V-shaped notch proximate the tube path acting as a locator for the cartridge within the cartridge chamber. The transverse projections of the blade cartridge have a beveled leading edge which are complementary to the V-shaped locating notch in the cartridge chamber. A cam lock assembly is included to retain the blade cartridge within the cartridge chamber located on the carriage. The cam lock assembly includes a shaft mounted to the carriage having an eccentric fixed to the shaft for rotatably engaging the blade cartridge and a nut for locking the shaft in position once the eccentric has been set against the blade cartridge. In the preferred form the operator inserts the blade and blade cartridge combination into the carriage, inserting the beveled projection of the cartridge into the receiving V-shaped portion of the cartridge chamber. The cam lock assembly is then rotated until the eccentric engages the rear beveled portion of the cartridge assembly thereby retaining the cartridge assembly in position. This assembly allows the operator to quickly and efficiently change the notching blade. If the notching blade should encounter a broken guillotine blade lodged in the clamping jaws the force of the collision will cause the cam lock assembly to release. After the cam lock assembly is released the notching blade cartridge will be pushed back into the carriage assembly along the transverse and longitudinal slots located on the carriage assembly.

Another aspect of the subject device allows the notching blade cartridge to be expelled from the carriage assembly should the notching blade encounter a broken guillotine blade lodged in the clamping jaws. A discharge chute of sufficient size to enable the notching blade cartridge to pass through the carriage uninhibited is located in the carriage at the rear portion adjacent to the transverse and longitudinal slot located on the carriage assembly. The notching blade cartridge is then pushed back into the carriage assembly along the transverse and longitudinal slots and when the cartridge reaches the discharge chute the cartridge is then expelled from the carriage assembly.

BRIEF DESCRIPTION OF THE DRAWING

FIG. 4 is a perspective view of the means for mounting the notching cartridge in the carriage;

FIG. 5 is an exploded perspective view of the means for mounting notching blade in the notching blade cartridge;

FIG. 6 is a side view of the notching blade cartridge after being released from the biasing means;

DETAILED DESCRIPTION OF THE PREFERRED EMBODIMENT

Figure 1:
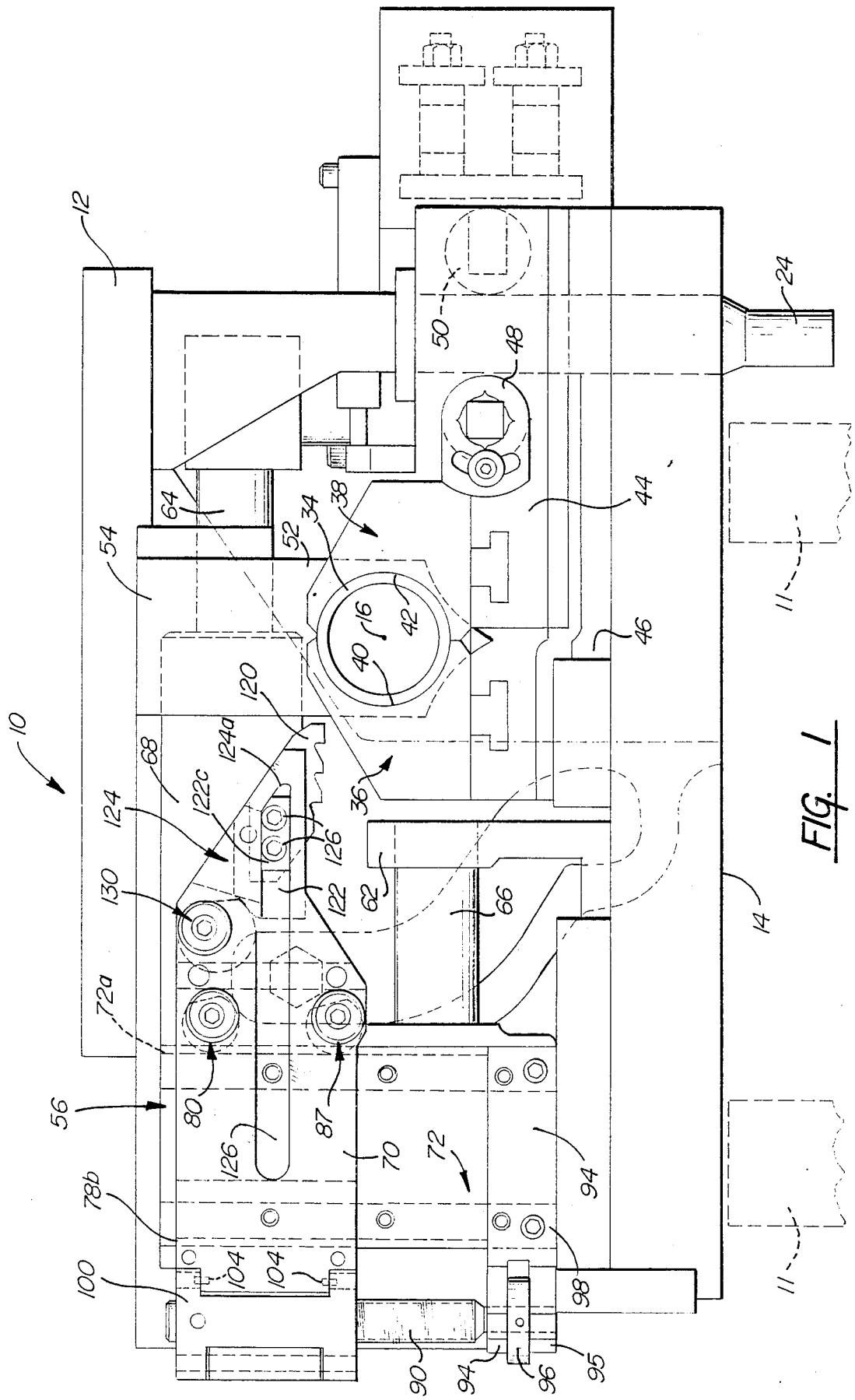
FIG. 1 is an end elevational view of a cut-off die set according to the invention.
Figure 2:
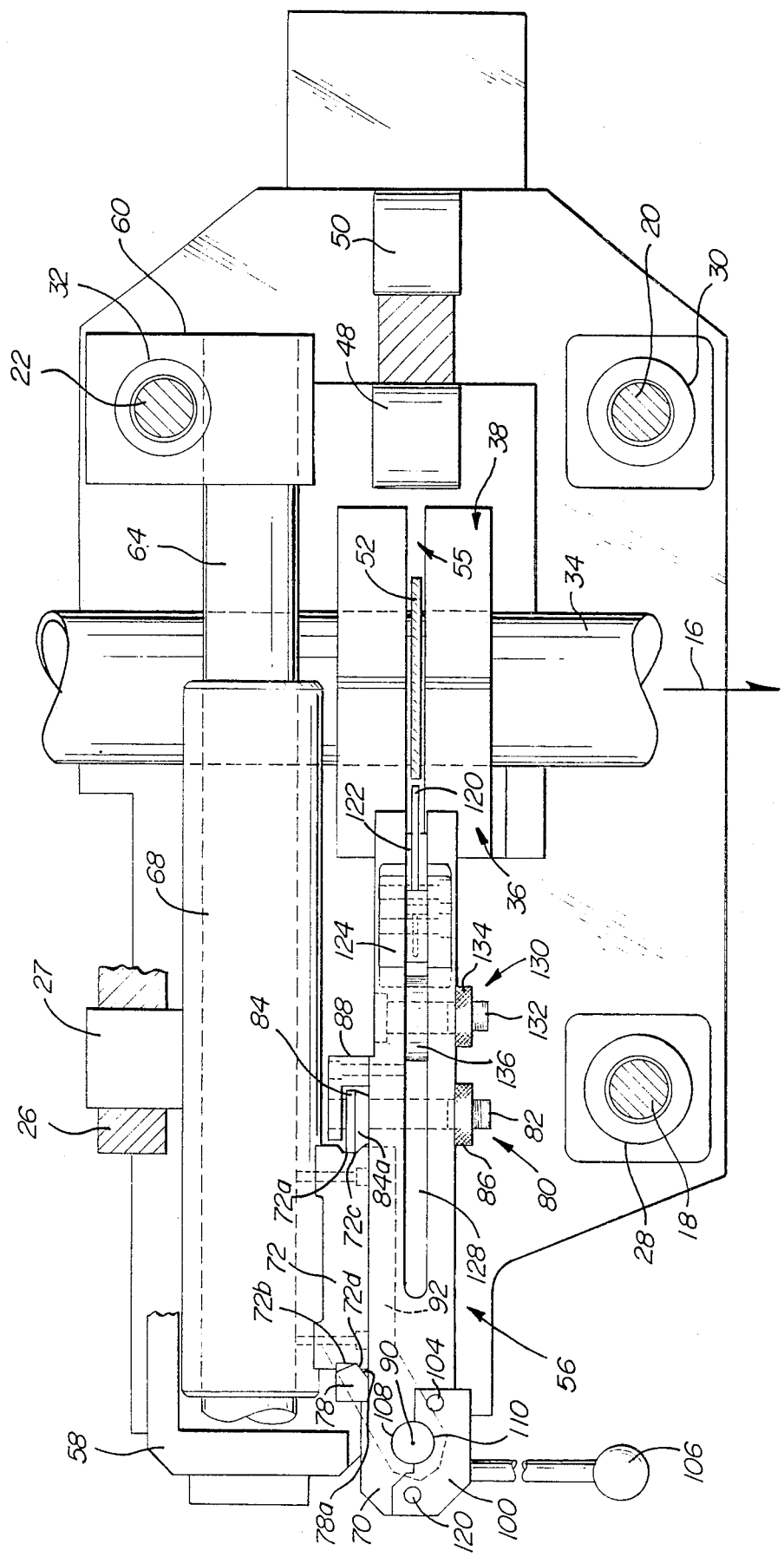
FIG. 2 is a top view of the invention cut-off die set with portions removed for clarity of illustration.

The illustrated cut-off die set 10 is adapted to be employed in a tube cutting apparatus and is slidably movable along a set of rails 11 which are part of the press base. The press includes a swinging or reciprocating ram mechanism (not shown) which bears against an upper platen 12 and serves to operate the cut-off die set 10. In die sets of the general type with which the present invention is concerned, the cut-off die set is positioned to receive the tubing as it emanates from the fabrication mill and the ram mechanism operates to cause the clamping jaws within the die set to clamp the die set to the rapidly moving tubing. The die set, clamped to the moving tube, moves together with the tube along the rails 11. The ram mechanism then causes the notching blade to make a notching cut in the upper periphery of the tubing whereafter the main cut-off blade is lowered to sever a length from the moving tube. Following the final severing cut, the ram mechanism, then operating in a reverse manner, first causes retraction of the main cut-off blade and the notching blade and then unclamping of the die set from the tube section as the cut-off die set approaches the end of its travel on the rails 11. The cut-off die set is then returned to its initial position on the rails set 11 preparatory to initiation of a new cut-off cycle.

Cut-off die set 10 includes an upper platen or shoe 12 and a lower platen or shoe 14.

Upper platen 12 overlies the tube path 16 and includes three guide rods 18, 20 and 22 extending downwardly from spaced locations on the underside of platen 12. Guide rod 18 is positioned on the left-hand or near side of tube path 16 and guide rods 20 and 22 are positioned at the front and rear of the cut-off die set respectively on the right-hand or remote side of tube path 16. A die jaw cam 24 extends downwardly from upper platen 12 generally between guide rods 20 and 22 and a cam guide 26 extends downwardly from upper platen 12 adjacent the rear edge thereof and on the near or left-hand side of tube path 16.

A plurality of guide sleeves or bushings 28, 30 and 32 upstand from lower platen 14 and respectively telescopically receive the lower ends of guide rods 18, 20 and 22 so as to guide upper platen 12 in reciprocal movement relative to lower platen 14 during the tube severing operation.

The tubing 34 emanating from the tube forming mill is clamped to the die set 10 by means of two pairs of die jaws 36 and 38 each having a complementary inner radius contour 40 and 42, conforming to the tube contour. The reciprocal clamping and disengaging movement of die jaws 36 and 38 is produced by sliding movement of an upper die jaw holder 44 and a lower die jaw holder 46 slidable on each other. The die clamping jaws 36 and 38 are adapted to be reciprocated towards and away from each other in synchronism with the movement of the upper platen relative to the lower platen by coaction of die jaw cam 24 passing between a pair of clamping rollers 48 and 50 carried respectively by the upper die jaw holder 44 and lower die jaw holder 46. The manner in which the cam 24 coacts with the rollers 48 and 50 to move the die jaws 36 and 38 into and out of clamping engagement with tube 34 will not be further described since this mechanism is known and is not part of the present invention. Further details of a mechanism of this type may be found in U.S. Pat. Nos. 4,108,029 and 4,294,147, both assigned to the assignee of the subject application.

A shearing blade 52 is mounted in a blade holder assembly 54 which in turn is secured to the underside and extends downwardly from upper platen 12. Die jaws 36 and 38 are spaced apart at 55 relative to the tube axis to provide a clearance space through which the blade 52 passes when the ram operating mechanism reciprocates the upper platen 12 downwardly sufficiently to pass through the plane of the tube.

A notching assembly seen generally at 56 operates to provide a notching cut in the upper periphery of the tube prior to the downward severing movement of the guillotine 52 so as to preclude the necessity of further working of the severed tube section following the severing operation.

Notching assembly 56 is supported on a cross slide assembly 68 comprising a support bracket 58, a support bracket 60, a support bracket 62, an upper guide shaft 64 and a lower guide shaft 66. A cam follower 27 is fixed to the cross slide 68 and follows cam guide 26 having a curvilinear cam track 26a. Movement of the upper platen 12 causes the cam guide 26 to impart reciprocal motion 69 to the cross slide 68. Further details of a cross slide mechanism of this type may be found in U.S. Pat. No. 4,766,792, assigned to the assignee of the subject application.

In the preferred form a guide member 72 is fixedly mounted to the cross slide 68 at right angles to the cross slide movement by means of threaded fasteners extending through a transverse bore 72e located on the guide member and received in a threaded bore 68a on the cross slide. While here threaded fasteners are used other types of fastening means such as rivets, welding or brazing may be used. The guide member 72 has guide notches 72a, 72b located on opposite and parallel side surfaces of the guide member 72 establishing a guideway. Fastened to the carriage 70 by suitable fastener means, here screws, is a fixed load bearing gib 78, and two cam lock assemblies 80,81 parallel and to the fixed load bearing gib 78. The load bearing gib 78 and cam lock assemblies 80 and 81 are used to displaceably secure the carriage to guideway. The cam lock assemblies 81,82 comprise a cam shafts 82,83 extending transversely through the body of the carriage 70, eccentrics 84,85 fixed to the cam shafts 82,83 on the guideway side of the carriage 70 and knurled nuts 86,87 bearing against the carriage on the side opposite the guideway for locking the eccentrics 82,83 in position once set. The cam eccentrics are self-locking, the knurled nuts are used as an additional locking feature for retaining the eccentrics in the locked position. The cam shafts are further supported proximate the guideway by a retaining gib 88 having transverse bores 88a adapted to receive the cam shafts 82,83. The guide notches 72a, 72b establishing the guideway have beveled bearing surfaces 72c, 72d located on the carriage side of the guideway. These beveled surfaces are complementary to the beveled surface 78a existing on the fixed load bearing gib 78 and the beveled surfaces 84a, 85a of the eccentrics 84,85. These beveled portions act as a further cam mechanism to tightly fasten or bind the carriage 70 against the guide member 72.

Further features of the eccentrics 84,85 include flat portions 84b, 85b enabling the operator to rotate the cam shafts 82,83 until the flat portions 84b, 85b are opposite the guideway 72c enabling the operator to remove the carriage 70 from the guide member 72. This feature allows the operator to remove the carriage and have easy access to the die jaws and clamping mechanism for quick and efficient maintenance or repair.

The carriage 70 may be adjusted to any position along the guide member 72 by means of an adjustment screw 90 having a shaft 91 mounted in a base 92. A calibrated adjustment dial 96 fixed between the upper flange 94 and lower flange 95 of the base 92. The shaft of the adjustment screw 91 extends through the upper flange 94 having a bore 94a through the calibrated adjustment dial 96 and then through the lower flange 95 having a bore 95a, a dowel 98, pin or other fastening means is used to fix of the calibrated adjustment dial 96 to the shaft of the adjustment screw 91. The base 92 is mounted to the guide member 72 by means of threaded fasteners through bore 92a.

Once more threaded fasteners are used. Obviously any other fastening means such as rivets, welds, brazing or similar fasteners could be used. The base 92 could even be made as an integral part of the guide member 72 or the cross slide assembly 68. The mounting mechanism of the adjustment screw 90 enables the operator to turn the calibrated adjustment dial 96 allowing the adjustment screw 90 to be rotated. The adjustment screw 90 is a precision threaded rod, Acme 1"-5-2g rod is used. Other types of threaded rods having differing diameters, pitch lengths, and thread configurations could be used. The adjustment screw enables the operator to relate the rotation of the calibrated adjustment dial 96 to the change in displacement along the adjustment screw 90.

Adjustment screw 90 is threadably engaged to the carriage 70 by means of a half nut 100 fixed to the carriage 70. The half nut 100 is fixed to the carriage 70 by a pivot pin 102 extending through bores 100a located on the half nut 100 and bore 112 located on the carriage 70. A handle 106 is fixedly mounted to the half nut 100 enabling the operator to swing the half nut on the hinge mechanism established by the pin 102. The half nut 100 has a threaded half bore 11c complementary to the threads existing on the adjustment screw 90. The carriage 70 has a non-threaded half bore 108, the half bore equaling the outer diameter of the adjustment screw 90. A pair of spring loaded detent pins 104 are fixedly mounted to the half nut 100 and are used to retain the half nut 100 in a closed position by engaging complementary indentations or locating notches 114 in the carriage.

Other means can be used to selectively couple the carriage to the adjustment screws. For example, parallel and opposite flat sides may be ground on the adjustment screw thus giving it a rectangular shape having opposing threaded sides. Two adjustable bushings are then placed in the carriage, each bushing having a notch cut in the bushing corresponding to the flat portion on the adjustment screw. When the bushings are 90 degrees out of phase with each other the adjustment screw is engaged to the carriage. However, when the bushings are rotated so that the notches are aligned, the carriage can then be uncoupled from the adjustment screw.

In the preferred form, the adjusting means and the means for displaceably securing the carriage 70 to the cross slide 68 combine to work together as follows. The operator first uncouples the carriage 70 from the adjustment screw 90 by applying pressure to the handle 106 to release the spring loaded detent pins 104 from their holding notches 114. Once released the operator may swing the half nut 100 away from the carriage 70 using the pin 102 as a hinge axis. The carriage is now released from the adjustment screw 90 as the non-threaded half bore 108 will slidably move along the adjustment screw 90. The operator then releases the cam lock assemblies 80, 81 allowing the carriage to be positioned at any point along the guide member. By applying reverse pressure to the handle 106 of the half nut 100 the half nut threads 110 are recoupled to the adjustment screw 90 allowing the operator to use the calibrated adjustment dial 96 to achieve whatever fine adjustment is desired. After the carriage 70 is repositioned the cam lock assemblies 80, 81 are rotated to lock the carriage 70 in position along the guide member 72.

Figure 3:
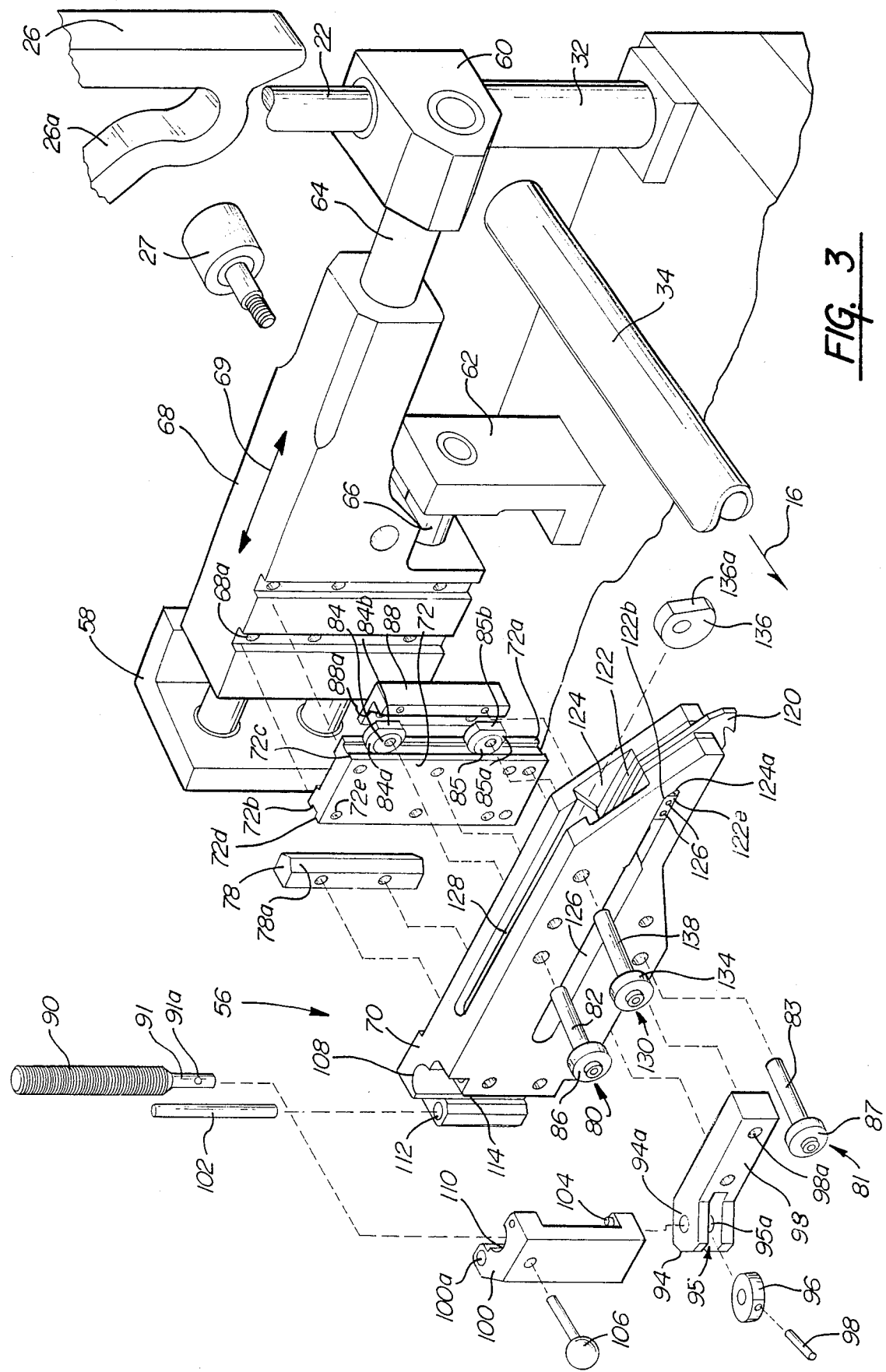
FIG. 3 is fragmentary view of the mounting means for notching blade.

Referring further to FIGS. 4 and 5, the invention further includes a notching blade secured to the carriage 70 wherein the notching blade is used to notch the tubing 34 before the vertical cut is made by the guillotine blade 52. The notching blade 120 is contained in a notching blade cartridge 122 having a transverse bore 122a in the upper surface of the blade cartridge 122. The bore 122a is adapted to receive a pin 123 made of hardened drill rod press fit into the cartridge. The notching blade 120 has a corresponding transverse half bore located in the upper surface of the notching blade 120 as a load bearing surface of the notching blade 120. The notching blade 120 further has transverse bores 120a adapted to receive fasteners 126 extending through transverse bores 122f located on the notching blade holder 122. The notching blade 120 is inserted in a slot 122b on the notching blade cartridge, fasteners 126 are placed through the transverse bores 122f, 120a securing the notching blade 120 to the blade cartridge 122. The blade cartridge 122 further includes rectangular shaped oppositely identical transverse projections 122c extending outward from the body of the blade cartridge 122. The side projections 122c further have a beveled upper surface 122d proximate the notching blade 120, these beveled surfaces are bearing surfaces used in retaining the cartridge 122 in a fixed position on the carriage 70. The carriage 70 has a blade cartridge chamber 124 for receiving the blade cartridge 122. The chamber 124 has two opposite V-shaped notches 124a with the apex of the notches closest to the tube path 16. (See FIGS. 3 and 6.) The cartridge chamber 124 further includes transverse and longitudinal slots 126 and 128, respectively, extending rearwardly from the cartridge chamber along the body of the carriage 70. Further included for retaining the blade cartridge within the cartridge chamber 124 is a cam lock assembly 130 having a shaft 132, an eccentric 136 and a knurled locking nut 134. The eccentric 136 is adapted to act on the beveled rear portion 122e of the blade cartridge 122.

The blade cartridge 122 is secured within the carriage 70 by inserting the cartridge 122 into the cartridge chamber 124 and placing the projections 122c in the slots 126 and then sliding the cartridge 122 forward until projections 122c are in slots 124a. The cam lock assembly 130 is then rotated until the eccentric 136 bears upon the rear beveled surface 122e of the blade cartridge 122. The eccentric 136 locks the cartridge 122, i.e., with 122d against the forward end of 124a. The eccentric 136 is a self-locking eccentric and the knurled locking nut 134 is used as an additional locking mechanism.

Referring to FIG. 6, the cam lock assembly 132 also acts as a release for the blade cartridge 122 should the blade 120 come into contact with an immovable object in the die set. Usually contact occurs when a guillotine blade 52 is broken off and remains lodged in the notch 55 between the die jaws 36 and 38. Should this occur in previous models, a catastrophic failure would occur as something must give, usually the notching blade assembly. Here the transverse 126 and longitudinal notches 128 of the carriage 70 allow the notching blade cartridge 122 to be pushed into the carriage allowing the carriage 70 to return to its pre-notch position without engaging the broken guillotine blade 52. The release mechanism is accomplished by a flat portion 136a located on the eccentric 136 of the cam lock assembly 126. As shown in FIG. 6 when the notching blade 120 encounters an immovable object the force acts upon the eccentric 136 rotating the eccentric 136 slightly, enabling the flat portion 136a to release the bearing pressure exerted on the rearward bearing surface 122e of the blade cartridge 122. Once released the blade cartridge will slide rearwardly in the transverse 126 and longitudinal 128 slots of the carriage 70. Obviously, other biasing means could be used to retain the cartridge in the V-shaped notches 124a. For example, a compression spring driving a plunger can be inserted into the transverse longitudinal slots 128 and used to urge the blade cartridge in its furthermost secured position. The compression spring will also act as a release mechanism should the blade cartridge 122 be forced back into the carriage 70.

Figure 7:
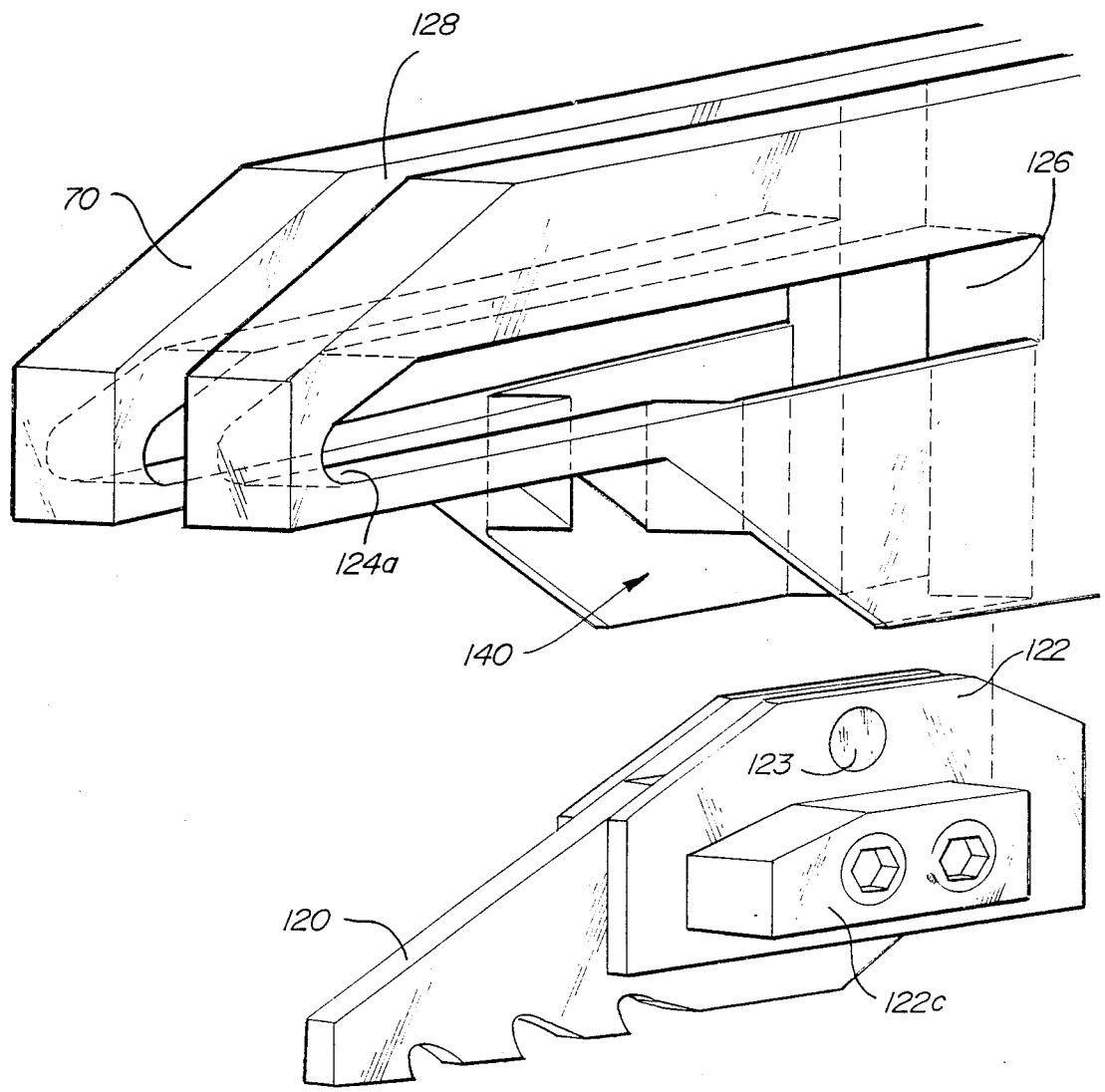
FIG. 7 is a perspective view of the means for expelling the notching blade cartridge from the carriage.

Referring now to FIG. 7. FIG. 7 shows the notching blade cartridge 122 being expelled from the carriage 70 through a discharge chute 140 located in the carriage 70. The cam lock assembly 130 has been omitted from FIG. 7 for clarity, obviously the cam lock assembly 130 is still used as a retaining and releasing means for the notch blade cartridge 122. As seen in FIG. 7, the cartridge chamber 124 has been omitted, in this case it is possible to insert the cartridge chamber through the discharge chute 140 then urging it forward along the transverse and longitudinal slots 126 and 128 respectively. While the cartridge chamber 124 is omitted from FIG. 7, it should be obvious to one skilled in the art that a carriage can be constructed having both an insert chamber 124 and discharge chute 140.

The described mounted arrangement for the notching blade will be seen to provide a firm positive support for the blade throughout its reciprocal motion used in accomplishing the notching stroke. Specifically, the described support mechanism for a notching blade allows the various movements of the notching blade to be precisely adjusted with respect to the required notching depth. The mounting arrangement for the notching blade allows it to be releasably secured to the carriage thus enabling a safety feature to prevent catastrophic failure should a movable object be left within the die set.

Although a preferred embodiment of the invention has been illustrated and described in detail, it will be apparent that various changes may be made in the disclosed embodiment without departing from the scope or spirit of the invention. Moreover, the terms "vertical" and "horizontal" are used herein in a relative sense and do not suggest any given orientation of the mechanism described when placed into actual use.

We claim:

1. A notching blade assembly for use in mounting a notching blade to the cross slide of a double cut tube cut-off die set comprising:
    a cross slide;
    first means defining a guideway on said cross slide;
    a carriage;
    second means on said carriage cooperative with said guideway for displaceably securing the carriage to the cross slide;
    third means independent of said second means for adjusting the position of the carriage along said guideway;
    fourth means for selectively coupling and decoupling said third means;
    a notching blade; and
    fifth means for securing the notching blade to the carriage.

2. A notching blade assembly as defined in claim 1 wherein said first means comprises a guide member mounted to the cross slide at right angles to the direction of cross slide movement.

3. A notching blade assembly as defined in claim 2 wherein the guide member has opposite and parallel side surfaces extending perpendicular to the direction of the cross slide movement, further including the sides of the guide member having guide notches defining a guideway extending the length thereof.

4. A notching blade assembly as defined in claim 3 wherein said second means comprises first and second gibs mounted to the carriage for securing said carriage to said guideway.

5. A notching blade assembly as defined in claim 4 wherein the first gib has a bearing surface engaging the complementary bearing surface of the guideway.

6. A notching blade assembly as defined in claim 5 wherein the second gib comprises a cam lock assembly.

7. A notching blade assembly as defined in claim 6 wherein the cam lock assembly comprises a shaft mounted in the carriage; an eccentric mounted to the shaft; and a nut for locking the cam shaft in the set position; and a third gib mounted to the carriage for supporting the shaft proximate the eccentric.

8. A notching blade assembly according to claim 7 wherein said third means acting independent of said second means comprises:
    an adjustment screw having opposite ends, one end threadably engaged to said carriage; and
    means for rotatably mounting the opposite end of said adjustment screw in a fixed position.

9. A notching blade assembly as defined in claim 8 wherein said rotatably mounting means includes a base mounted to the cross slide having upper and lower flanges; a calibrated adjustment dial fixed to the adjustment screw between the upper and lower flanges of the base.

10. A notching blade assembly as defined in claim 9 wherein said fourth means comprises:
    coupling means for threadably engaging said carriage to said adjustment screw.

11. A notching blade assembly as defined in claim 10 wherein the coupling means comprises:
    the carriage having a half bore equal to the diameter of the adjustment screw;
    a pivot pin retained in the carriage;
    a half nut mounted to the pivot pin for threadably engaging the adjustment screw;
    means for fixing the half nut to the carriage; and
    a handle mounted to the half nut.

12. A notching blade assembly as defined in claim 11 wherein the means for securing the notching blade to the carriage comprises:
    a notching blade cartridge;
    mounting means for mounting the notching blade in the notching blade cartridge; and
    retaining means for retaining the notching blade cartridge in a fixed position within the carriage.

13. A notching blade assembly as defined in claim 12 wherein said mounting means comprises the notching blade having a transverse bore in the body of said notching blade; a notching blade cartridge having a transverse bore in the body of said cartridge; and fastener means for fastening said notching blade cartridge to said notching blade.

14. A notching blade assembly as defined in claim 13 wherein said mounting means further comprises:
the notching blade having a transverse half bore extending downward from the upper surface of the notching blade;
the notching blade cartridge having a transverse bore in the body of said cartridge; and
a pin engaging said half bore in the notching blade to said full bore in the notching blade cartridge.

15. A notching blade assembly as defined in claim 14 wherein said retaining means comprises:
the carriage having a chamber for said cartridge; and
a means for releasably retaining said cartridge in said chamber.

16. A notching blade assembly as defined in claim 15 wherein said notching blade assembly further includes a tube path proximate said carriage;
said cartridge chamber having a V-shaped notch located in the chamber on the side nearest the tube path, whereby the apex of said V-shaped notch is closest to said tube path;
said chamber further including transverse and longitudinal slots extending outward from the chamber opposite the tube path along the body of the carriage;
the notching blade cartridge having a transverse side projection for retaining said cartridge in said slots, said side projection further having a beveled edge for engaging said V-shaped notch in the cartridge chamber to hold said cartridge in position; and
biasing means for urging the notching blade cartridge into the V-shaped notch.

17. A notching blade assembly as defined in claim 16 wherein a discharge chute is located in the carriage at the end of said slots, said chute being of sufficient size to enable the notching blade cartridge to pass through said carriage uninhibited.

18. A notching blade assembly as defined in claim 16 wherein said biasing means comprises:
a cam lock assembly mounted in the carriage.

19. A notching blade assembly as defined in claim 18 wherein said cam lock assembly comprises:
a shaft mounted in the carriage;
an eccentric fixed to said shaft; and
means for fixing said shaft in the set position.

20. A notching blade assembly for use in mounting a notching blade to the cross slide of a double cut tube cut-off die set comprising:
a cross slide;
a carriage;
a guide member, mounted on said cross slide, having opposite and a parallel side surfaces extending perpendicular to the direction of cross slide movement, the parallel side surfaces of the guide member having guide notches defining guideways extending the length thereof;
a first gib mounted to the carriage having a bearing surface engaging one complementary bearing surface of the guideway; and
a cam lock assembly mounted to the carriage engaging the opposite complementary bearing surface of the guideway, wherein said first gib and cam lock assembly secure said carriage to said guideway.

21. A notching blade assembly as defined in claim 20 wherein the cam lock assembly comprises:
a shaft mounted in the carriage;
an eccentric mounted to the shaft; and
means for fixing said shaft in a set position; and
a third gib mounted to the carriage for supporting the shaft proximate the eccentric.

22. An adjustment assembly for use in adjusting the position of a notching blade holder along a guideway establishing on a cross slide assembly of a double-cut tube cut-off die set comprising:
a cross slide having a guideway;
a carriage slidably mounted to said guideway;
adjustment means for adjusting the position of the carriage along said guideway; and
coupling means for selectively coupling and decoupling said adjustment means from said carriage, wherein said adjustment means when coupled to the carriage is used to adjust the position of the carriage on said guideway.

23. An adjustment assembly according to claim 22 wherein said adjustment means comprises:
an adjustment screw having opposite ends, one end threadably engaged to said carriage; and
means for rotatably mounting the opposite end of said adjustment screw in a fixed position.

24. An adjustment assembly as defined in claim 23 wherein said adjustment means further includes:
a base mounted to the cross slide having upper and lower flanges;
a calibrated adjustment dial mounted between said upper and lower flanges; and
means fixing said calibrated adjustment dial to said adjustment screw.

25. An adjustment assembly as defined in claim 24 wherein said coupling means comprises:
means for threadably engaging said carriage to said adjustment screw.

26. A notching blade assembly as defined in claim 25 wherein the coupling means comprises:
the carriage having a half bore equal to the diameter of the adjustment screw;
a pivot pin retained in the carriage;
a half nut mounted to the pivot pin for threadably engaging the adjustment screw;
means for fixing the half nut to the carriage; and
a handle mounted to the half nut.

27. A notching blade assembly for use in mounting a notching blade to a carriage of a double cut tube cut-off die set comprising:
a notching blade;
a notching blade cartridge;
mounting means for mounting the notching blade in the notching blade cartridge;
a carriage having a chamber for retaining said notching blade cartridge;
a tube path proximate said carriage;
said chamber having a V-shaped portion located near the tube path, wherein the apex of the V-shaped portion is closest to said tube path;
said chamber further including transverse and longitudinal slots extending outward from the chamber opposite the tue path along the body of the carriage;
said notching blade cartridge having a transverse projection for retaining said cartridge in said slot, said cartridge further having a beveled edge for engaging the V-shaped portion of the chamber to position said notching blade cartridge; and
means for releasably retaining said notching blade cartridge in said chamber.

28. A notching blade assembly as defined in claim 27 wherein a discharge chute is located in the carriage at the end of said slots, said chute being of sufficient size to enable the notching blade cartridge to pass through said carriage uninhibited.

29. A notching blade assembly as defined in claim 27 wherein said releasably retaining means comprises:
a cam lock assembly mounted in the carriage.

30. A notching blade assembly as defined in claim 29 wherein said cam lock assembly comprises:
a shaft mounted in the carriage;
an eccentric fixed to said shaft; and
means acting upon said carriage for locking said shaft into position.

* * * * *